(12) United States Patent
Varden

(10) Patent No.: X6922
(45) Date of Patent: Feb. 6, 1832

(54) WARMING ROOMS, & MANAGEMENT OF HEAT

(76) Inventor: Robert B. Varden

Robert B. Varden.
Letters Patent

The schedule referred to in these Letters Patent and making part of the same
containing a description in the words of the said Robert B. Varden himself
of his improvement in the management of heat for warming rooms called
"the Fuel saver or Economical Housewarmer."

---

Be it known that I Robert B. Varden of Baltimore in the County of
Baltimore and State of Maryland have made a new and useful improve-
ment in the management of heat for warming rooms called "The Fuel
saver or Economical House warmer" which is described as follows —
The chimney is constructed by erecting four walls of brick stone or cast
iron or both on a proper foundation leaving suitable openings for the fire plac
es, flues, air chambers, out lets and in lets for cylinders pipes and other
necessary appendages hereafter described. The fire place of the first story is
made of cast iron in one piece and let into the brick work of the chimney on
each side and over the top in front and resting on the hearth is placed
a metallic frame containing cold air admitted from the cellar or else-
where through apertures in the hearth to create a draft in the fireplace
the air having access to the fire place through small apertures in the sides
of the metallic hollow frame. In the centre of the hearth is another pass-
age for the admission of cold air from the cellar or elsewhere to the fire
place. This passage is covered by a metallic base having small apertures
through its top and side next the fire to admit the air to the fire. An air
chamber is constructed behind the cast iron fire place covered at top
by an iron plate cutting off the smoke from it. the air in said chamber
being heated by the sides & back of the fire place and by the passage of
the smoke & flame over the plate first mentioned the heated air is ad-
mitted into the room from said chamber through openings in the sides
thereof. A cylinder to contain heated air is placed above the iron plate
of the air chamber and extends across the chimney its ends being inser-
ted in openings made in the side walls or plates to receive them, it is
placed placed in such a manner as to allow of proper draft around it, in one end
is a ventilator to permit a free escape of heated air into the room or to shut
it off; in the other end is a door to admit articles to be baked if necessary,
which are to be placed on a false bottom in the cylinder or oven. on the
top of the cylinder are two pipes opened or closed when required by damp-
pers on the ends of rods extending through the side walls or plates of the
chimney. One of these pipes is smaller than the other; the larger one con-
ducts the heated air from the cylinder to another chamber for heated
air hereafter to be described, the smaller one when uncovered allows all
impure air in the cylinder to escape into the flue. There are also two
pipes on the inside against the breast of the chimney, one end of each ex-
tending below the lower iron plate and the other extending above the upper
plate or arch placed over the cylinder. these pipes convey the heated air
from the lower to the upper heated air chamber. A scraper is placed
between the cylinder and iron plate over the lower heated air chamber
so as to remove the soot which may collect on the top of said plate. The
upper heated air chamber is formed by the under part of the second story
hearth. the walls or plates of the chimney and the arch or plate over the
cylinder. the air in this chamber is heated by the arch or plate over the
cylinder and the iron flue hereafter described. Through the hearth of
the second story and communicating with the upper heated air chamber
are two passages for the admission of the heated air from said chamber
into the rooms of the second story. there are also two round openings
through said hearth into which are inserted tin or other tubes or pipes
to convey the heated air to the third story or wherever desired. A part of
the flue is made of iron commencing at the lower part of the arch or plate
against the back wall of the chimney and after passing through the
upper heated air chamber heats the air therein and extends a sufficient
distance where the brick work of the flue commences and is continued
through the roof. At a suitable distance from the second hearth there is
an opening made on the front of the chimney, across this opening at the
bottom there is a bar of iron to which is hung a gate or shutter of sufficient
width to cover the above mentioned opening, this gate or shutter [illegible]

& a small handle attached to it may be either closed or opened at pleasure.
Into this opening may be inserted the pipe of a stove if required by which
the second story of the house may be warmed when there is no need of fire
in the first story. The Fuel Saver or Economical Warmer. In the
third story (or in any other story in which the warmer hereafter to be describ
ed is to be used) is made an opening in the wall of the chimney about the
size of the flue of the chimney across this opening at the top is secured a
bar of iron to which is hung a swinging valve opened by a rod or bar
of iron in front. to cut off the passage of the smoke up the flue and
turn it horizontally through the opening just mentioned into the fuel
saver or economical warmer through an opening in the back near
the bottom thereof. This warmer is of a round, square or other shape
made of rolled, wrought or cast metal about 5 feet high 4 feet long and
1½ feet wide closed entirely except where the smoke is admitted and
escapes and where the air cylinders are inserted and a small opening in
front for the rod or bar above mentioned. the air cylinders are three in
number but may be more or less. placed longitudinally at a proper
distance apart and within the warmer open at both ends to allow of
a free passage of the the heated air from them into the room, on the top
is another opening the size of the flue around which is formed a flange
or projection over which is placed a square pipe or conductor the same
size as the one last mentioned. to convey the smoke after its having en
tered the warmer & circulated around the several air cylinders through
an opening in the chimney again into the flue. The pipe or conductor
intended to convey the smoke from the warmer to the flue has the other
end thereof placed in the last mentioned opening in the chimney.
Besides the pipe or conductor last mentioned there is another one of the same
size to be made of rolled or wrought or cast metal or of clay burnt or un-
burnt to be used in conducting the heat from the chimney to the warmer.
Besides the valve before described for changing the direction of the smoke
from the flue to the warmer, three others may be used, the first is hung on
hinges at the end of the conducting pipes. the second is placed within
the pipes, both made to close the flue of the chimney by [illegible] [illegible] to which they

United States Patent

Patent No.: X6922 they are attached, extending through the front of the screen; the third is
simply a plate of metal passing horizontally across the flue of the chim-
ney and where between the two conducting pipes of the screen. A damp-
er is also placed in each of the conducting pipes. In the front of the screen-
er is an opening to admit a stove pipe from a stove to be used when
there is no fire in the first story. The cylinder and plates in the chim-
ney may be dispensed with and the main flue brought down to the throat
of the fire place on the first floor. What I claim as my invention & im-
provement and for which I solicit Letters Patent is the before described
mode of managing heat by which rooms are warmed and cooking
performed from the caloric that usually escapes with the smoke through
the flue of the chimney Witnesses
Geo. W. Grant
Charles C. P. [illegible]

R. B. [illegible]

1512 [illegible]